United States Patent [19]

Daignot et al.

[11] Patent Number: 4,726,609
[45] Date of Patent: Feb. 23, 1988

[54] BEAD REINFORCEMENT WITH TUBULAR STRUCTURE WITH DIVISIBLE ARMATURE

[75] Inventors: Bernard Daignot; Claude Roux, both of Decize, France

[73] Assignee: Caoutchouc Manufacture et Plastiques, France

[21] Appl. No.: 838,936

[22] Filed: Mar. 12, 1986

[30] Foreign Application Priority Data

Mar. 15, 1985 [FR] France .................................. 8503811

[51] Int. Cl.⁴ .............................................. A16L 35/00
[52] U.S. Cl. ......................................... 285/4; 285/208; 285/229
[58] Field of Search ............................. 285/229, 4, 208

[56] References Cited

U.S. PATENT DOCUMENTS

| 2,710,630 | 6/1955 | Greer | 285/208 |
| 2,998,986 | 9/1961 | Buono | 285/229 |
| 3,640,172 | 2/1972 | Mercier | 285/208 |

Primary Examiner—Dave W. Arola
Attorney, Agent, or Firm—Antonelli, Terry & Wands

[57] ABSTRACT

Radial device for anchoring one end of a flexible tubular structure to a mating flange, characterized by a flexible tubular structure having a bead reinforced by an armature embedded in rubber, one-piece and rigid at the time of manufacture of the tubular structure but mechanically divisible into predefined segments at the time of the flexible tubular structure mounting, to allow the bead to bend so that it can slide into the bore of the rigid wall.

The invention applies to any industrial assembly, for example expansion joints or air suspension diaphragms.

14 Claims, 21 Drawing Figures

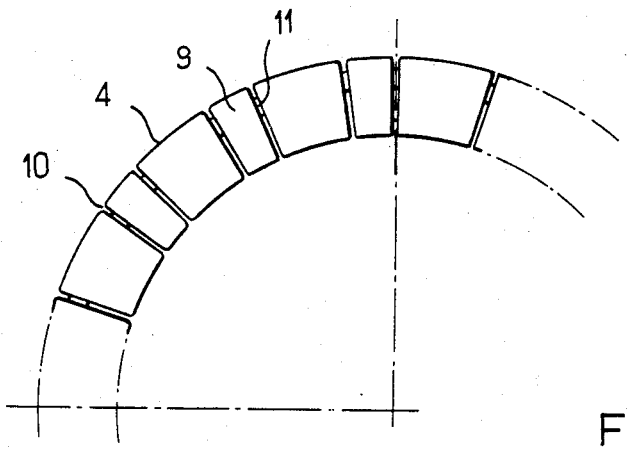
FIG_5
FIG_6a
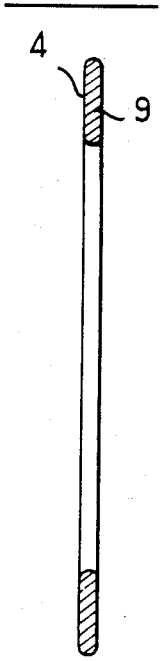
FIG_6b
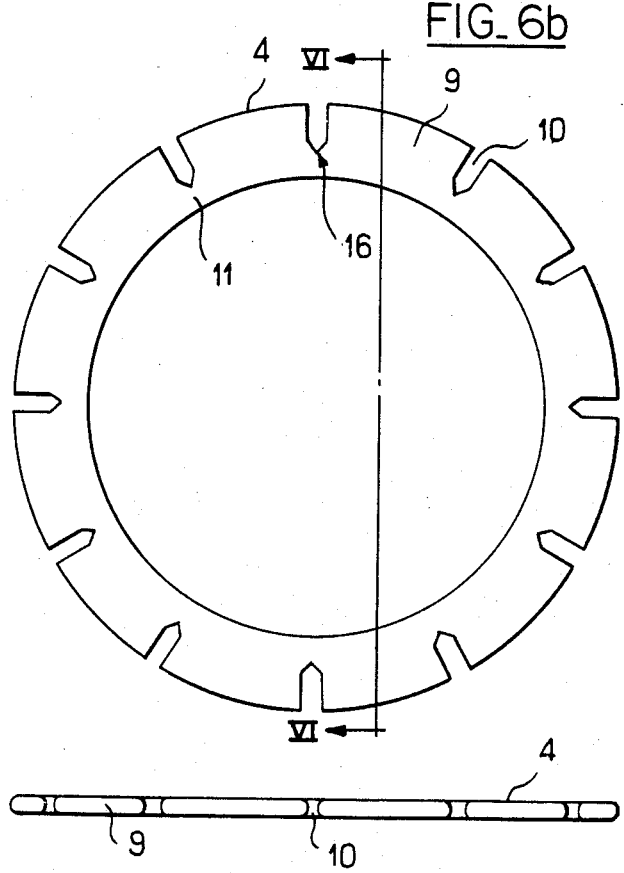
FIG_6c
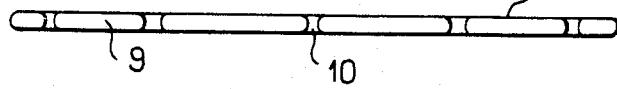

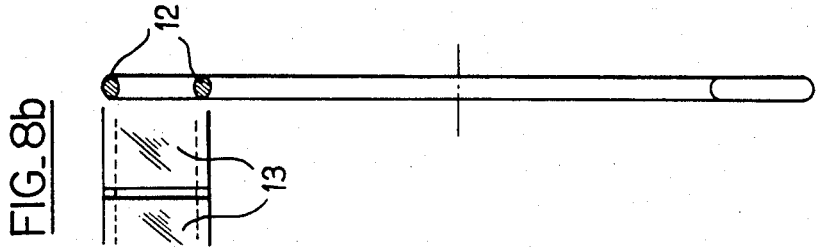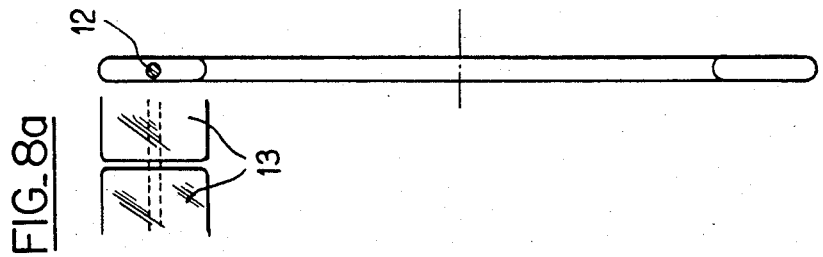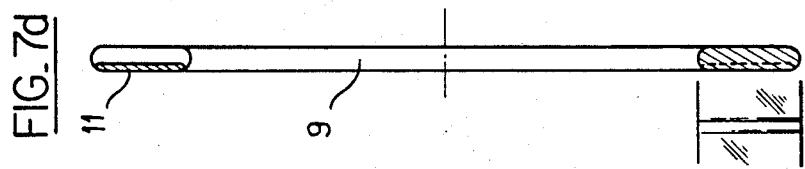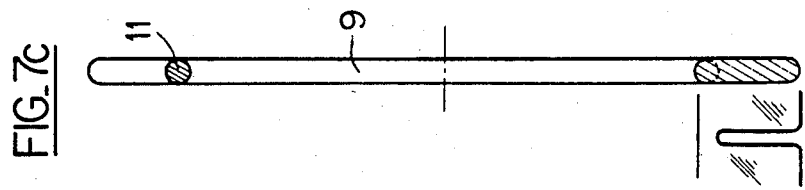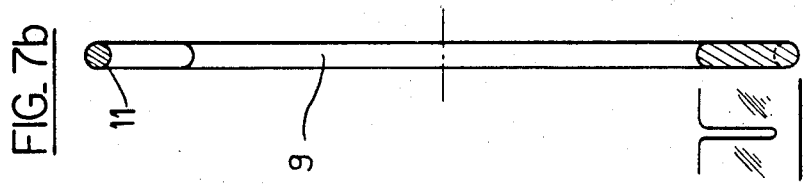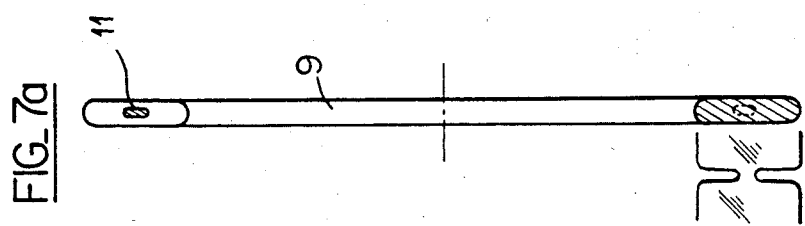

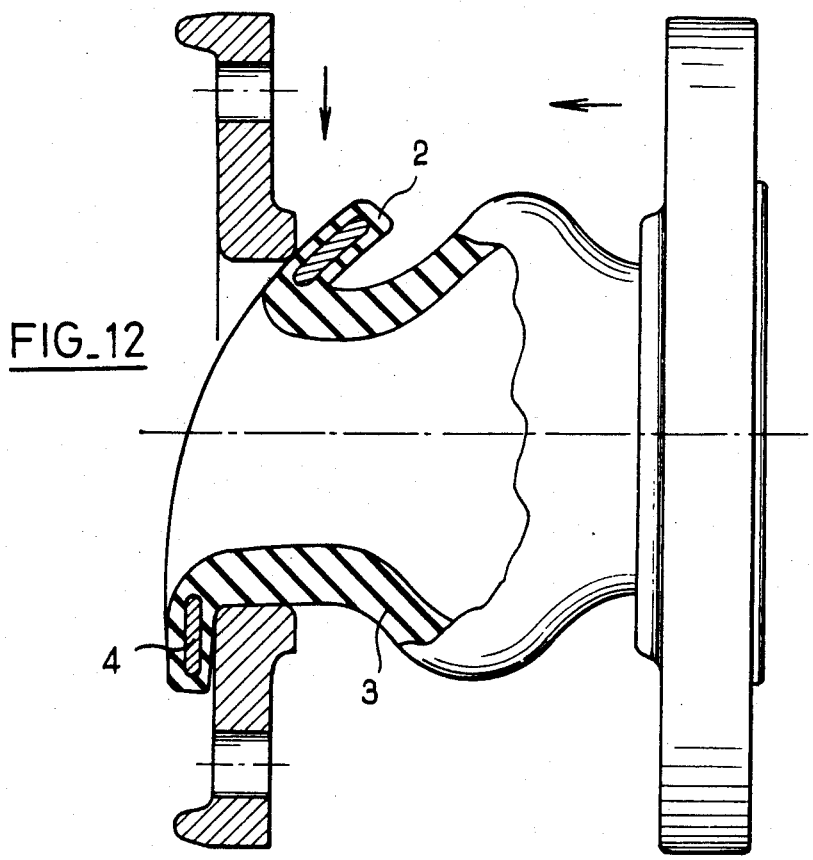
FIG_12
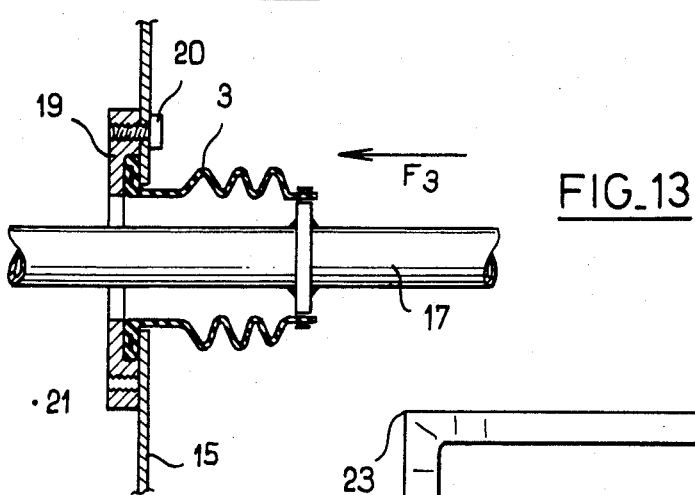
FIG_13
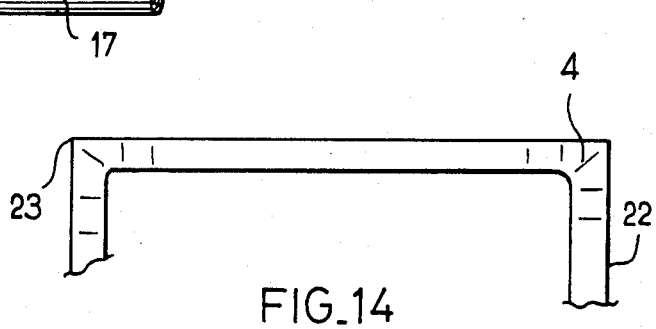
FIG_14

BEAD REINFORCEMENT WITH TUBULAR STRUCTURE WITH DIVISIBLE ARMATURE

BACKGROUND OF THE INVENTION

The present invention relates to a radial anchoring system for traction elements of a flexible tubular structure which is achieved by axially pressing a portion of the tubular structure on a shoulder or flange after passage through an opening provided in a rigid wall or mating flange. In this text, to simplify the disclosure of the invention, the term "sleeve" will be used to define the flexible annular structure and the term "bead" will define the end of the sleeve which has a larger diameter than that of the sleeve and which abuts the rigid wall, hereinafter called "mating flange."

Sleeves with a flexible bead are known wherein the bead generally has an internal armature, i.e. embedded in the rubber, of annular form, composed of high-modulus rubber, a textile ply, a textile or metal strand, or a flexible spring. This type of reinforcement is adopted to render the bead deformable to permit mounting mating flanges after manufacture of the sleeve, by forcing the bead through the bore. The major drawback of these systems is the requirement of a pinching of the flat flange between two planes, according to the device proposed by, for example, the Societe Kleber Industrie for Dilatoflex NT expansion sleeves (technical dossier 79-BA1), or by the use of a machine form for a rigid part to abut a diameter inside this deformable bead, as proposed, for example, in the air suspension diaphragms described in the French Patent FR 72.02268, or in the expansion sleeves described in French patents FR 2 280 853, 2 033 789 or FR 2 006 730.

These sleeve systems with flexible beads require mounting techniques which often cause a strong stress concentration at the end of the mating flange, which can go as far as damaging or even destroying the sealing function. Hence, the usual sleeves with flexible beads can only be used for moderate service pressures. To overcome these drawbacks, it has been proposed in, for example, U.S. Pat. No. 2,998,986 to provide rigid sleeves having large contact areas with the flange. This is in fact the solution adopted by Kleber Industrie for the Endflex system described in the Performer AD10 pipe catalog, page 4 or Dilatoflex K expansion sleeves described in catalog FC175-18, June 1984.

All these devices have high rigidity and are usually built with metal elements. Because of their design, rubber is compressed over a large contact surface area which improves stress distribution and reduces creep sensitivity, thus providing a better guarantee of tightness and the possibility of utilization at high service pressures.

However, due to their rigidity, these beads have the disadvantage of making it impossible to mount one-piece mating flanges after a manufacturing of the sleeve. Thus, it is necessary to mount the mating flanges during production and to vulcanize the sleeve thus equipped with these metal parts, which considerably adds to the weight and volume.

In addition, mating flanges are no longer demountable as shown by the Stenflex and General Rubber catalogs. The sleeve manufacturer must hence keep a large inventory on hand so that sleeves equipped with flanges conforming to the various standardized connections are available.

A sleeve with demountable flanges is described in patent French Pat. No. 2447512 but the beads are rigid and have reinforcing collars separate from the sleeve. The proposed solution, which consists of surrounding the collar by a U-shaped rubber form, requires the use of a very complex mold.

As can be seen from the above analysis, no solution has been proposed which enable the requirements of anchoring quality (to withstand high service pressures or pulls), tightness of bonding, and ease of mounting on a flange or rigid shoulder to be met.

Hence, an object of the invention resides in providing an anchoring device which offers the advantages of the two types of known beads without accompanying disadvantages as encountered in the prior art. According to the present invention, an anchoring is obtained by a bead having a large contact surface on the flange or shoulder, while offering a flexibility so as to allow for a bending for passage of the bead through the bore.

Thus, the invention permits a simpler manufacturing of the sleeve by eliminating the weight and volume problems required by the necessity, in previously known solutions, of mounting the mating flanges during manufacture. Moreover, this represents an essential saving and considerably reduces the need to maintain a large parts inventory due to the various standardized connections since the same range of sleeves can be equipped with the various types of commercial or customized mating flanges at the time of delivery. Management and marketing of the sleeves is thus greatly facilitated and delivery times are considerably reduced.

According to the present invention, a radial anchoring device is provided on at least one end of a flexible tubular structure or sleeve such as a rubber hose, deformable collar, expansion joint, or suspension diaphragm by abutting a shoulder or mating flange after passing through an opening or bore made in a rigid wall, with the flexible tubular structure or sleeve having at least one bead reinforced by an armature embedded in the rubber, which is one-piece and rigid at the time it is manufactured, but mechanically divisible at the time of mounting into predefined sections or segments to allow the bead to bend so it can slide into the bore of the rigid wall without altering, after a return to a plane shape, the radial rigidity which confers on the bead the necessary strength for proper operation in service when compressed between the flange and the mating flange.

Advantageously, the rigid bead-reinforcing armature of the present invention may be of a highly rigid metal or plastic hoop with the armature being predivided into at least four sections or segments by predivision zones with a minimum thickness of 0.05 mm.

At the time the sleeve is manufactured, the rigid armature is in a one-piece form which facilitates a handling and positioning thereof in the mold. At the end of the vulcanization operation, the sleeve thus has a rigid bead. At this time or at the time of mounting in the mating flanges, the armature is mechanically divided into sections or segments by applying pressure in a vicinity of the predivision zones. The sections, or segments embedded in the rubber, are articulated with each other without damaging the reinforcing carcass of the sleeve and permit passage of the bead through the bore by bending the bead which has become flexible, with the bead reopening on the shoulder naturally after the mating flanges have been put in place. The bead, secured between the connecting flange and the mating flange or shoulder retains a radial rigidity equivalent to that of a bead having a one-piece armature by the self-squeezing effect.

The divisible armature is preferably made of a metal such as, for example steel, aluminum, Zamak, or any other material with a modulus greater than 1500 MPa.

It can be made of reinforced plastic or composite material provided the material allows a clean break in the predivision zones.

It can be a single material (metal, reinforced plastic, or composite) or be made with a central core of breakable material, molded inside a stronger material to force the break to occur in the desired area.

The armature, thus predivided into sections, or segments can be made by partial machining, by molding, or by forming depending on the workability of the material of which it is composed. At the time the sleeve is made, the armature can be placed in the bead either bare or covered with a ply of rubber mixture or of a fine textile material, the latter two possibilities having the advantage of preventing the carcass of the sleeve from being damaged by contact with the angles of the divisible armature.

The number of sections or segments is preferably between seven and thirteen, but it can be as high as permitted by the strength of the material and manufacturing economics.

The general shape of the sections is usually trapezoidal but other possibilities such as rectangular, triangular, lozenge, or double trapezoidal can be considered as nonlimitative examples; however, these latter shapes would complicate manufacture of the divisible armature but would not impede operation thereof.

The predivision zones are generally radially oriented but the divisible reinforcement function is not disturbed if the predivision zones have a slight inclination, of between 0° and 40° for example to the diametral plane.

The predivision zones more commonly are rectilinear but the zones may have the shape of the arc of a circle, any curve, or chevron. Their widths are between 5% of the width of the armature, to permit formation of gum bridges between the rubber mixtures surrounding them, and 50% of the width of the armature, so as not to render the armature fragile or too deformable.

The connecting part of the sections, before division, is preferably less than 25% of the thickness of the armature when metal materials are used but it can be as high as 90% to 95% of the thickness of the armature if a very breakable material is used wherein light pressure or a tap would be sufficient to cause breakage. The predivision zones are preferably located on the part of the armature which is on the bore size, but any other arrangement can be used.

The characteristics and variants of the invention will be better understood by reading the description hereinbelow with reference to the drawings, wherein:

BRIEF DESCRIPTION OF THE DRAWINGS

FIGS. 3, 4 and 5, are plan views of alternate embodiments of a divisible armature for reinforcement of a bead constructed in accordance with the present invention;

FIG. 6a is a cross sectional view taken along the line VI—VI in FIG. 6b;

FIG. 6b is a plan view of another embodiment of a divisible armature for reinforcement of a bead constructed in accordance with the present invention;

FIG. 6c is an edge view of the armature of FIG. 6b;

FIGS. 7a–7d are partial cross sectional views of alternate arrangements of predivision zones for the divisible armature constructed in accordance with the present invention;

FIG. 7e is a partial cross sectional view of the divisible zone of FIG. 7d;

FIGS. 8a and 8b illustrate alternate manners of forming the divisible armature of the present invention out of two materials;

FIG. 12 is a partial cross sectional view illustrating the mounting principle of the mating flanges;

FIG. 13 is a cross sectional view of one application of the subject matter of the present invention; and FIG. 14 is a plan view of another application of the present invention.

DETAILED DESCRIPTION

Figure 1A:
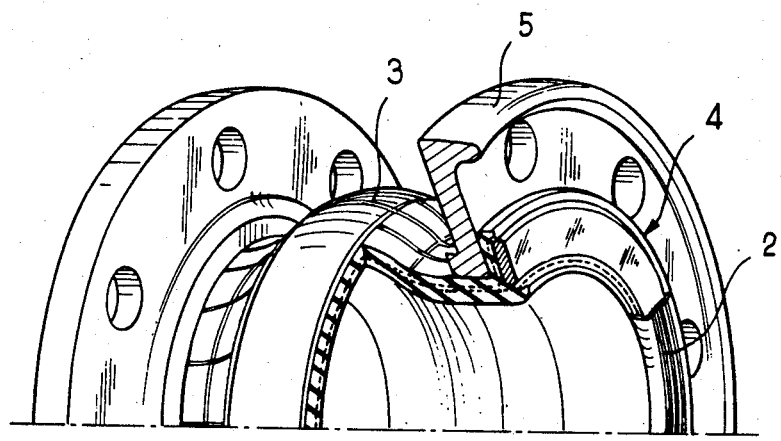
FIG. 1a is a partial cross sectional view of a bead of an expansion sleeve having a rigid armature part.
Figure 1B:
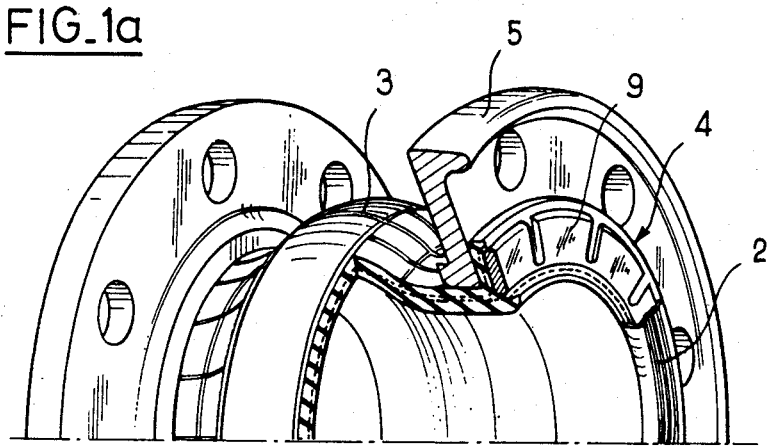
FIG. 1b is a partial cross sectional view of a bead of an expansion sleeve having a divided armature part.

Referring now to the drawings wherein like reference numerals are used throughout the various views to designate like parts and, more particularly, to FIG. 1a, according to this figure, an annular armature 1 of a bead 2 of an expansion sleeve 3 is provided with a rigid bead fitted with a mating flange 5. As shown in FIG. 1b, according to the present invention, it is possible to eliminate the upper layer, made of rubber, of the bead 2 which is thus stripped down to the armature 1 or 4 as the case may be.

Figure 2:
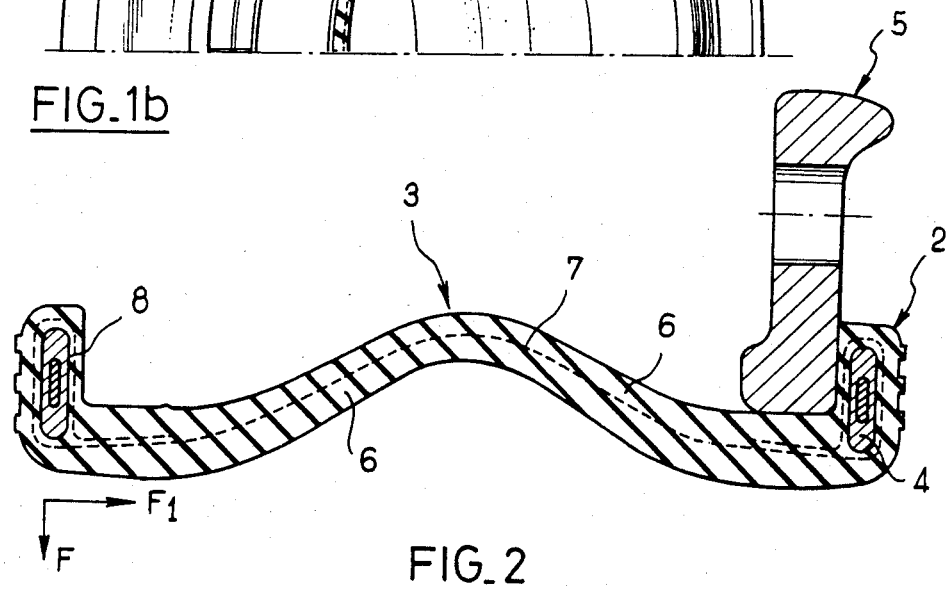
FIG. 2 is a cross sectional view of a flexible sleeve having beads.

As shown in FIG. 2, the sleeve 3 includes a rubber body 6 reinforced by carcass of textile or metal plies 7 whose beads 2, which rest on shoulders or mating flanges 5, are reinforced by sectionalized armatures 4. One can see the enclosure 8 of carcass 7 around armature 4 in the area of beads 2.

FIG. 2 depicts the force F which develops when sleeve 3 is pressurized and locks segments 9 of armature 4 against each other in a self-squeezing action in the diametral plane without the sections being displaced, with force $F_1$ being the traction force exerted on textile or metal carcass 8 of the sleeve 3. The resistance to the tractive force $F_1$, or rigidity, is not affected by the division into sections and the performance of sleeve 3 remains identical in service to that which would be obtained with a sleeve 3 with beads 2 reinforced by continuous rigid armatures.

Figure 3:
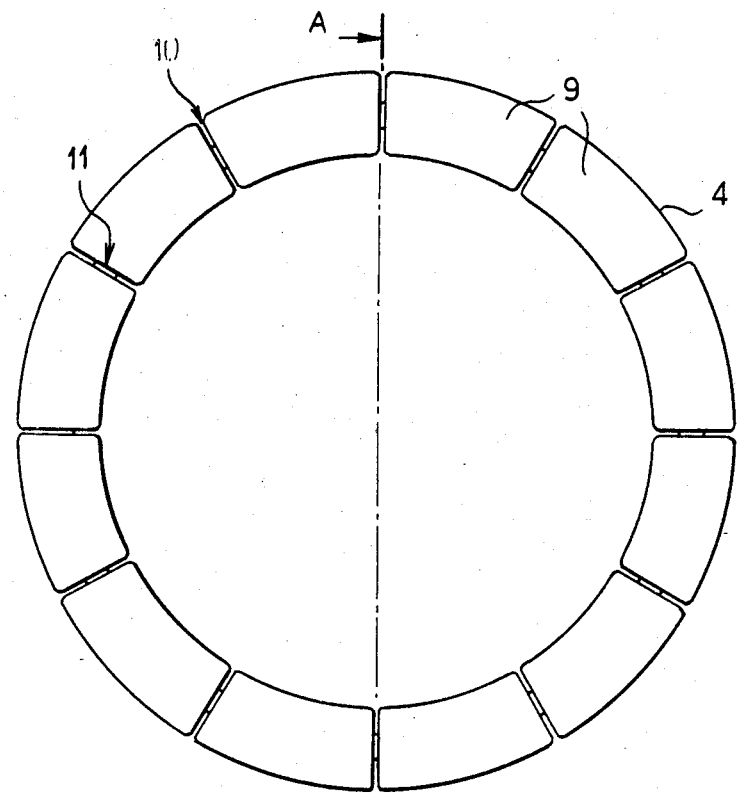

As shown in FIG. 3, a divisible armature 4 of the most common type is divided into twelve segments 9 of the same size, generally trapezoidal in shape, separated by predivision zones 10 whose thickness is small as compared with that of the segment 9. The connecting part 11 of the segments 9, intended to be broken, is situated in a middle of the predivision zone 10.

Figure 4:
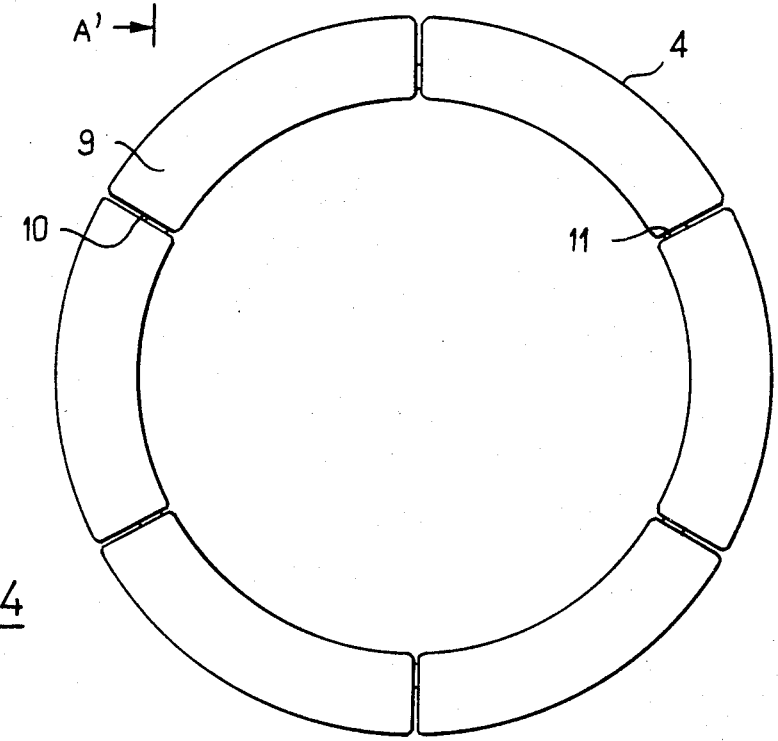

FIG. 4 provides an example wherein the divisible armature 4 has six segments 9. In FIG. 4, the segments 9 are all of the same size and the predivision zones 10 are still of a small thickness as compared with the segments 9, and the connecting part of the segments 9, designed to be broken, is located toward an inner part of the predivision zone 10.

In FIG. 5, the divisible armature 4 includes thirty-two segments 9, of a general trapezoidal shape, of different sizes and alternately arranged, with the large sections and small sections alternating. The connecting part 11 of the segments 9, designed to be broken, are located toward the inner part of the predivision zones 10.

In FIGS. 6a, 6b, 6c, a divisible armature 4 is provided which includes twelve segments 9, with all of the segments 9 being of identical shape and size. The width of the predivision zones 10 is about 6% of the width of the segments 9, and the predivision zones 10 terminate in a pointed portion 16 to facilitate breakage.

FIGS. 7a–7e depict the various possible configurations of the predivision zones 10 between two segments 9, taken along a section line AA' in FIG. 3.

In FIG. 7a, the connecting part 11 of the segments 9 are in a vicinity of the center of the armature and they can be made by casting; whereas, in FIG. 7b, the connecting parts 11 of the segments 9 are in a vicinity of an outer edge of the armature and can be made by sawing or casting.

In FIG. 7c, the connecting parts 11 of the segments 9 are in a vicinity of an inner edge of the armature and can also be made by sawing or casting. Likewise, with regard to FIGS. 7d and 7e, the connecting parts 11 of the segments 10 are notched on one face thereof so as to enable the manufacturing of the same by casting or sawing.

FIGS. 8a, 8b illustrate alternative embodiments of a divisible armature 4 taken along the line AA' in FIG. 3, when the divisible armature 4 is made from two different materials, with the core or continuous element 12 being made of a breakable material which constitutes connecting parts 11 of the segments 9, and the overmolded material 13 being made of a rigid material. The core 12 can be a single core and occupy a central position with respect to overmolded material 13 as in FIG. 8a. It can also have two cores 12 which, as shown in FIG. 8b, occupy extreme positions with respect to overmolded material 13. It is also possible to make divisible armature 4 by overmolding, by placing one or two cores 12 in any position with respect to overmolded material 13 in a manner not shown in the drawings.

Figure 9:
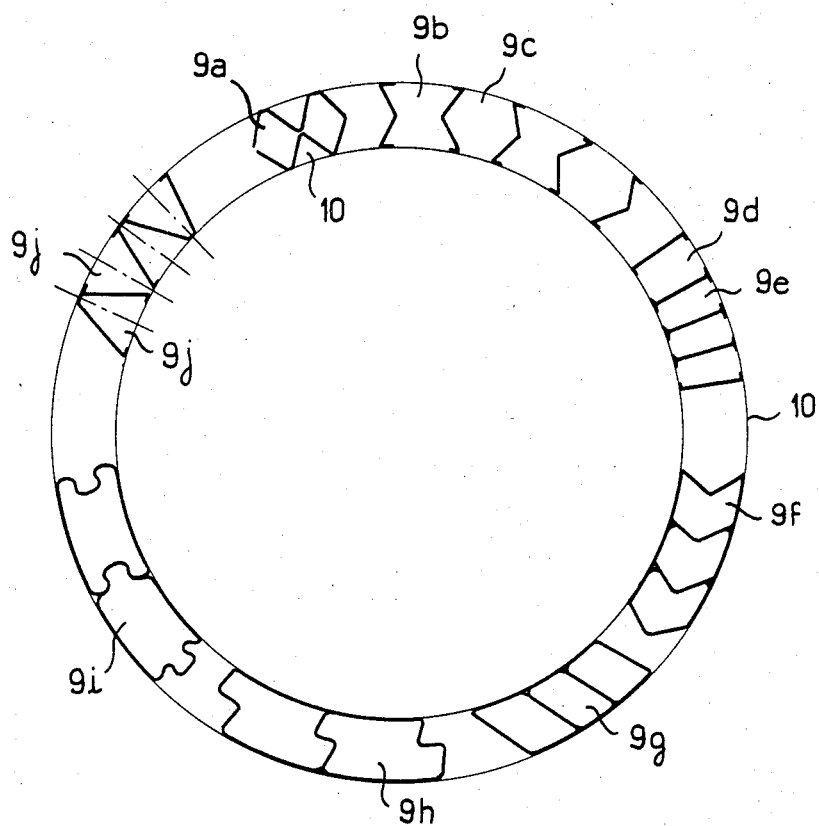
FIG. 9 is a plan view illustrating the various shapes the respective elements may have for the same armature.

In FIG. 9, the segments 9a are lozenge-shaped and have between them a large predivision zone 10 and a small connecting part 11. Segments 9b, 9c are in the shape of double trapezoids linked by the small base in the case of the segments 9b and by the large base in the case of the segments 9c segments 9b, 9c are generally used together and have a predivision zone 10 with a small surface area between them, the breakage zone being in the form of a broken line. It would also be possible to associate only segments 9b or segments 9c which would increase the flexibility of the bead by making the surface area of the predivision zone separating two sectors larger. These configurations, associating only segments 9b or 9c are not shown in the drawing.

As further shown in FIG. 9, with segments 9g which have a parallelpipedic shape, it is possible to obtain, as well as with other shapes such as 9b, 9c, 9h, 9i and 9j a greater pinching effect than with segments of different shapes 9a, 9d, and 9e because the friction along a broken line of breakage provides a locking effect compared to a possibility of a hinge effect along a rectilinear line of breakage.

Triangular shaped segments 9j lend themselves to mounting as shown in the drawing as an assembly (not shown) where all the vertices or all the bases of the triangular sections would be directed toward the center of the divisible armature.

Figure 10:
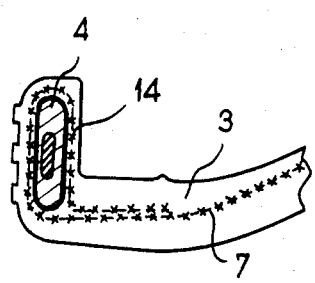
FIG. 10 is a partially schematic cross sectional view of an arrangement for protecting a carcass of the sleeve.

FIG. 10 illustrates a possibility of protecting a reinforcing carcass 7 of the sleeve 3 by surrounding divisible armature 4 with a protective ply 14 composed of a mixture based on rubber or a fine textile to protect the reinforcing carcass 7 from damage when in contact with the edges of divisible armature 4.

Figure 11:
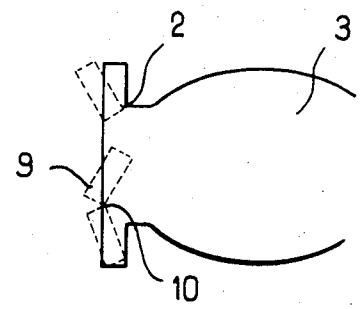
FIG. 11 is a schematic illustration of the technique of the divisibility of the armature constructed in accordance with the present invention.

FIG. 11 illustrates the way in which sections 9 become divided inside bead 2 of sleeve 3.

In practice, this division occurs either immediately after manufacture and vulcanization of the sleeve, and then becomes a finishing operation, or at the time the mating flanges are mounted, when the sleeve 3 is delivered.

In all cases, the division operation requires only simple tools such as, for example, a pair of pliers, to break the connecting part of the armature, by pressing on two consecutive sections 9 of the divisible armature 4, located in the bead 2 of the sleeve 3, in the vicinity of predivision zones 10.

FIG. 12 shows the mounting of the mating flanges 5 on the sleeve 3 by forced passage of the bead 2, comprising the divisible armature 4 which has previously been divided into independent segments 9, through the bore of mating flange 5.

FIG. 13 illustrates an application of the invention to passage of a pipe, a rod or a sheath 17 through a partition or wall 15 of, for example, a tank or a rigid pipe, when the inner part of the tank or the rigid pipe is inaccessible. The pipe, the rod or sheath 17 is held by a sleeve 3 fixed by a flange 19 fastened by bolts 20, with the arrow $F_3$ indicating the mounting direction.

The above figures have usually been illustrated by the application to bodies of revolution, but the anchoring device proposed is not limited to this type of part; and an operation thereof would be just as satisfactory for mounting on parts with an oval or rectangular opening. FIG. 14 gives a nonlimitative example of a rectangular opening such as a ventilation shaft 22 in which divisible armature 4 would be inserted only into the angular zones 23 of the shaft.

The divisible armature 4 of the invention can advantageously be used of reinforcing beads of hoses, expansion sleeves, or air suspension diaphragms of railroad or highway vehicles.

The applications of the invention are not limited to the cases illustrated. Among other possibilities, it is advantageous to use the system described in the invention for anchoring ends, which are then overmolded with rubber, tension or prestress cables, or for anchoring in openings of any shape of flexible emergency evacuation devices in buildings.

As may be seen from the above description and illustrations, the proposed anchoring device allows easy mounting of a sleeve, a sheath, or any other flexible object of tubular shape on a rigid form, the only condition being that the object to be anchored be supplied with a bead whose armature, according to the invention, is divisible.

In this way the invention avoids handling heavy and voluminous parts which complicate sleeve manufacturing molds or tools. It reduces the need to store a wide variety of sleeves, each of which has connecting mating flanges; and also decreases the necessary storage areas since sleeves without mating flanges are less voluminous than those so equipped. Moreover, the present invention simplifies filling of orders by allowing different types of mating flanges to be mounted for a given diameter; hence, due to these advantages, it permits an appreciable gain in productivity and improves working conditions when sleeves are manufactured.

Finally, if a sleeve is damaged, the mating flanges can be removed and re-used on a replacement sleeve, which represents a significant saving.

The individual skilled in the art can, of course, make various modifications to the device described above and its applications illustrated as nonlimitative examples without departing from the scope of the invention.

We claim:

1. Radial anchoring device for at least one end of a flexible tubular structure by abutting a flange after passage through a bore made in a rigid mating flange, said flexible tubular structure having at least at one end thereof a bead reinforced by a rigid armature, said rigid armature having predivision zones formed therein, said anchoring device being characterized in that said armature, being one-piece and rigid at the time it is embedded in the bead during manufacture of said tubular structure, is mechanically divisible into predefined segments by flexing two consecutive segments up to breakage in a predivision zone, said division being accomplished at the time of mounting of the flexible tubular structure, in order to offer the bead the possibility of being folded and allowing it to slide into the bore of the rigid mating flange without its radial rigidity being affected, through a pinching effect exerted on the divided segments by the tensioning of the flexible tubular structure under the internal pressure of use, thereby enabling a mounting of various types of mating flanges at the time of delivery rather than during a manufacturing of the flexible tubular structure.

2. Radial anchoring device according to claim 1, characterized in that the predefined segments of the divisible armature reinforcing the bead at the end of the flexible tubular structure have the same geometry.

3. Radial anchoring device according to one of claims 1 or 2 characterized in that a thickness of connecting parts linking the predefined segments of the divisible armature reinforcing the bead at the end of the flexible tubular structure are equal to at most 25% of a thickness of said armature.

4. Radial anchoring device according to claim 3, characterized in that a width of the predivision zones separating two consecutive segments of the divisible armature reinforcing the bead at the end of the flexible tubular structure is between 5% and 50% of a width of said armature.

5. Radial anchoring device according to claim 4, characterized in that the predivision zones of the predefined segments of the divisible armature reinforcing the bead at the end of the flexible tubular structure have an inclination of less than 40° to a radial plane of said armature.

6. Radial anchoring device according to claim 1, characterized in that the divisible armature reinforcing the bead at the end of the flexible tubular structure is made of alternating segments with different geometries.

7. Radial anchoring device according to claim 1, characterized in that the divisible armature reinforcing the bead at the end of the flexible tubular structure is made of one of a metal or plastic material whose modulus is equal to at least 1500 MPa.

8. Radial anchoring device according to claim 1, characterized in that the divisible armature reinforcing the bead at the end of the flexible tubular structure is covered with a protective ply of one of a rubber mixture or a fine textile.

9. Anchoring device according to claim 1, characterized in that the divisible armature includes at least one of eight, twelve, sixteen or twenty-four segments.

10. Anchoring device according to claim 1, characterized in that the divisible armature is covered with a protective ply of one of a rubber mixture or fine textile.

11. A radial anchoring device according to claim 1, characterized in that the tubular structure has at least one of a circular, oval, square or rectangular cross section.

12. A radial anchoring device according to claim 1, characterized in that the flexible tubular member is an expansion sleeve.

13. A radial anchoring device according to claim 1, characterized in that the flexible tubular member is a flexible hose including integral flanges.

14. A radial anchoring device according to claim 1, characterized in that the flexible tubular member is an air suspension diaphragm.

* * * * *

UNITED STATES PATENT AND TRADEMARK OFFICE
CERTIFICATE OF CORRECTION

PATENT NO. : 4,726,609
DATED : February 23, 1988
INVENTOR(S) : Daignot et al.

It is certified that error appears in the above-indentified patent and that said Letters Patent is hereby corrected as shown below:

On the title page, item [21], change "838,936" to --838,956--.

Signed and Sealed this

Twenty-third Day of April, 1996

Attest:

BRUCE LEHMAN

Attesting Officer

Commissioner of Patents and Trademarks